United States Patent
Rubin

(10) Patent No.: US 10,942,891 B2
(45) Date of Patent: Mar. 9, 2021

(54) REDUCING NUMBER OF QUERIES ON A RELATIONAL DATABASE

(71) Applicant: OwnBackup LTD, Tel Aviv (IL)

(72) Inventor: Shai Rubin, Binyamina (IL)

(73) Assignee: OWNBACKUP LTD., Tel Aviv (IL)

( * ) Notice: Subject to any disclaimer, the term of this patent is extended or adjusted under 35 U.S.C. 154(b) by 175 days.

(21) Appl. No.: 16/365,865

(22) Filed: Mar. 27, 2019

(65) Prior Publication Data

US 2020/0311023 A1    Oct. 1, 2020

(51) Int. Cl.
*G06F 16/11* (2019.01)
*G06F 16/2453* (2019.01)
*G06F 16/21* (2019.01)
*G06F 16/22* (2019.01)

(52) U.S. Cl.
CPC .......... *G06F 16/113* (2019.01); *G06F 16/213* (2019.01); *G06F 16/2282* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 5,546,571 A | 8/1996 | Shan et al. | |
| 5,548,755 A | 8/1996 | Leung et al. | |
| 6,175,836 B1 | 1/2001 | Aldred | |
| 8,032,522 B2 | 10/2011 | Goldstein et al. | |
| 8,126,870 B2 | 2/2012 | Chowdhuri et al. | |
| 8,285,711 B2 | 10/2012 | Bordawekar et al. | |
| 8,447,734 B2 | 5/2013 | Kirshenbaum | |
| 8,447,754 B2 | 5/2013 | Weissman et al. | |
| 8,572,039 B2 | 10/2013 | Kirshenbaum | |
| 8,606,752 B1 | 12/2013 | Beatty et al. | |
| 8,914,422 B2 | 12/2014 | Hale et al. | |
| 8,918,361 B2 | 12/2014 | Wong et al. | |
| 9,507,822 B2 | 11/2016 | Weissman et al. | |
| 9,576,072 B2 | 2/2017 | Gu et al. | |
| 9,607,042 B2 | 3/2017 | Long | |
| 9,898,545 B2 | 2/2018 | Idicula et al. | |
| 9,922,088 B2 | 3/2018 | Nica | |
| 10,019,478 B2 | 7/2018 | Liu et al. | |
| 10,049,134 B2 | 8/2018 | Bordawekar et al. | |
| 10,095,742 B2 | 10/2018 | Duan et al. | |
| 2006/0026199 A1 | 2/2006 | Crea | |

(Continued)

FOREIGN PATENT DOCUMENTS

CA    2618135 C    10/2014
WO    2014047736 A1    4/2014

OTHER PUBLICATIONS

International Application # PCT/IL2020/050279 Search Report dated May 25, 2020.

(Continued)

*Primary Examiner* — Uyen T Le
(74) *Attorney, Agent, or Firm* — Kligler & Associates Patent Attorneys Ltd

(57) ABSTRACT

Information management systems and methods archive and back up data from one or more primary storage devices to one or more secondary storage devices are described. More specifically, systems, methods, and computer program instructions are provided for efficiently transferring relational database data from one or more primary storage devices to one or more secondary storage devices for archival and backup purposes.

20 Claims, 6 Drawing Sheets

(56) References Cited

U.S. PATENT DOCUMENTS

| | | |
|---|---|---|
| 2006/0080285 A1 | 4/2006 | Chowdhuri |
| 2006/0200438 A1* | 9/2006 | Schloming |
| 2009/0313281 A1* | 12/2009 | Lowry ..................... G06F 8/71 |
| 2014/0115012 A1* | 4/2014 | Das ....................... G06F 16/211 |
| | | 707/803 |
| 2014/0201160 A1* | 7/2014 | Kumarasamy ...... G06F 11/1469 |
| | | 707/679 |
| 2015/0081642 A1 | 3/2015 | Bardini et al. |
| 2017/0300548 A1 | 10/2017 | Kumarasamy et al. |
| 2018/0113901 A1 | 4/2018 | Menzies-Smith |

* cited by examiner

REDUCING NUMBER OF QUERIES ON A RELATIONAL DATABASE

BACKGROUND

The present disclosure relates to data transfer and storage and, more specifically, to systems, methods, and computer program products for efficiently transferring data from one or more primary storage devices to one or more secondary storage devices for archival and backup purposes.

Data archiving typically involves copying selected data from a database on a primary storage device to a data archive on a secondary storage device, and then permanently deleting the selected data copied from the database on the primary storage device. The types of data that typically are archived include data that is not actively used and data that is needed for regulatory compliance, auditing purposes, and future reference. Data backup, on the other hand, typically involves capturing a complete copy of the data in a primary database on a primary storage device and storing the copy of the primary database on a secondary storage device without deleting the original data in the primary database on the primary storage device.

Data archiving and data backup both involve retrieving potentially a large amount of data from a relational database stored a primary storage device and copying the retrieved data to a secondary storage device. A structured query language (SQL) query, such as a "SELECT" query, can be used to retrieve data from a primary storage device. Depending on the number of records and the number of dependencies between the records in a relational database, a large number of queries may be required to traverse the dependencies and retrieve the required data. As the number of calls on the database increases, however, the performance of the database system declines and the financial costs increase.

SUMMARY

Example embodiments described herein provide information management systems, methods, and computer program products for archiving and backing up data.

In one aspect, the invention features a method of archiving data by one or more computing devices comprising computer hardware. A software module ascertains a subset of data in a database to archive. The data is organized in a plurality of tables generated by a database application on a client computing device. The subset of data stored in a subset of the plurality of tables in the database on a primary storage system. The software module obtains metadata from the database in the primary storage system and, based on the obtained metadata, determines a schema of the database. The software module determines dependencies between the subset of tables and one or more other tables of the plurality of tables based on the metadata and the schema. Based on a query by the software module on the database, a respective record identifier and one or more respective attribute values of each record in the ascertained subset of data to archive is retrieved. Based on a query by the software module on the database including the record identifiers retrieved in an immediately preceding retrieving step, a respective record identifier and one or more respective attribute values of each record in a set of dependent records are retrieved. The immediately preceding retrieving step is repeated to obtain a next set of dependent records. Data comprising the subset of data, and the retrieved record identifiers and respective attribute values in the database are extracted from the primary storage system. A secondary storage controller computer copies the extracted data to a secondary storage system. The extracted data is deleted from the primary storage system.

In another aspect, the invention features a data storage system configured to archive data. The data storage system includes a computing device executing a software module to ascertain a subset of data in a database to archive, the data organized in a plurality of tables generated by a database application executing on the client computing device, the subset of data stored in a subset of the plurality of tables in the database on a primary storage system. The computing device executes the software module to obtain metadata from the database in the primary storage system and, based on the obtained metadata, determines a schema of the database. The computing device executes the software module to determine dependencies between the subset of tables and one or more other tables of the plurality of tables based on the metadata and the schema. The computing device retrieves a respective record identifier and one or more respective attribute values of each record in the ascertained subset of data to archive based on a query generated by the software module executing on the client computing device and transmitted over a network connection to the database. The computing device retrieves a respective record identifier and one or more respective attribute values of each record in a set of dependent records based on a query by the software module on the database, the query comprising the record identifiers retrieved in an immediately preceding retrieving step. The computing device recursively repeats the immediately preceding retrieving step to obtain a next set of dependent records. The computing device extracts, from the primary storage system, data comprising the subset of data, and the retrieved record identifiers and respective attribute values in the database. A secondary storage controller computer copies the extracted data to a secondary storage system. The extracted data is deleted from the primary storage system.

In another aspect, the invention features a computer program product for execution by a computer system and comprising at least one non-transitory computer-readable medium having computer-readable program code portions embodied therein. The computer-readable program code portions include the following: an executable code portion configured to ascertain a subset of data in a database to archive, the data organized in a plurality of tables generated by a database application on a client computing device, the subset of data stored in a subset of the plurality of tables in the database in a primary storage system; an executable code portion configured to obtain metadata from the database in the primary storage system and, based on the obtained metadata, determining a schema of the database; an executable code portion configured to determine dependencies between the subset of tables and one or more other tables of the plurality of tables based on the metadata and the schema; an executable code portion configured to retrieve a respective record identifier and one or more respective attribute values of each record in the ascertained subset of data to archive based on a query on the database; an executable code portion configured to retrieve a respective record identifier and one or more respective attribute values of each record in a set of dependent records based on a query by the software module on the database comprising the record identifiers retrieved in an immediately preceding retrieving step; an executable code portion configured to recursively repeat the immediately preceding retrieving step to obtain a next set of dependent records; an executable code portion configured to extract, from the primary storage system, data comprising the subset of data, and the retrieved record identifiers and respective attribute values in the database; an executable code portion configured to copy, by a secondary storage controller computer, the extracted data to a secondary storage system; and an executable code portion configured to delete the extracted data from the primary storage system.

In another aspect, the invention features a method of backing up data performed at least in part by one or more computing devices comprising computer hardware. In accordance with this method a software module ascertains data in a database to back up, the data organized in a plurality of tables generated by a database application executing on a client computing device. The software module obtains metadata from the database in a primary storage system and, based on the obtained metadata, determines a schema of the database. The software module determines dependencies between the tables of the database based on the metadata and the schema. Based on a query by the software module on the database, a respective record identifier and one or more respective attribute values of each record in the database are retrieved. Based on a query by the software module on the database comprising the record identifiers retrieved in an immediately preceding retrieving step, a respective record identifier and one or more respective attribute values of each record in a set of dependent records are retrieved. The immediately preceding retrieving step is recursively repeated to obtain a next set of dependent records. Data comprising the ascertained data, the retrieved record identifiers, and respective attribute values in the database are extracted from the primary storage system. The extracted data is copied to a backup storage system by a backup storage controller computer.

The invention also features apparatus operable to implement the method described above and computer-readable media storing computer-readable instructions causing a computer to implement the method described above.

DETAILED DESCRIPTION

Introduction

Example embodiments described herein provide information management systems and methods for archiving and backing up data from one or more primary storage devices to one or more secondary storage devices, and more generally to systems, methods, and computer program instructions for efficiently transferring relational database data from one or more primary storage devices to one or more secondary storage devices for archival and backup purposes.

In the following description, like reference numbers are used to identify like elements. Furthermore, the drawings are intended to illustrate major features of exemplary embodiments in a diagrammatic manner. The drawings are not intended to limit the disclosed aspects nor depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof.

The term "metadata" include information about data objects or characteristics thereof.

The terms "module," "manager," and "unit" refer to hardware, software, or firmware, or a combination thereof.

Exemplary Embodiments

Figure 1:
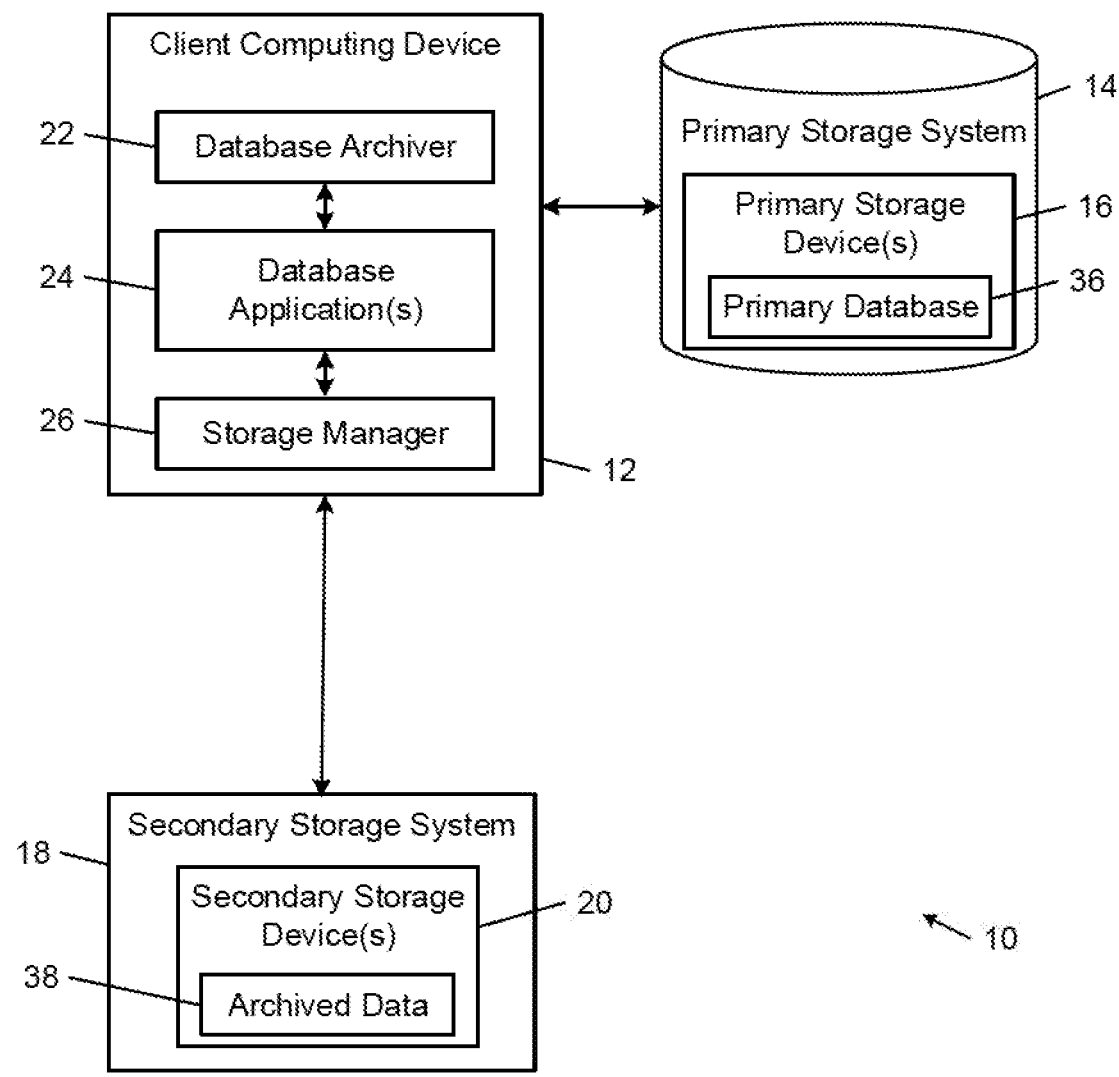
FIG. 1 is a block diagram of an embodiment of an information management system.

FIG. 1 is a block diagram of an exemplary network storage architecture system that includes an embodiment of an information management system 10 that includes various components that individually or collectively, in whole or in part manage, transfer, store, and process data and metadata. Metadata includes information about data objects or other information characterizing data objects. The information management system 10 includes a client computing device 12, a primary storage system 14 that includes one or more primary storage devices 16, and a secondary storage system 18 that includes one or more secondary storage devices 20.

In the illustrated example, the client computing device 12 includes a database archiving module 22 (referred to herein as the "archiver" or the "database archiver"), at least one database application 24, and a storage manager 26. In some embodiments, the database archiver 22 is a component of the storage manager 26. In other embodiments, the database archiver 22 is a separate component of the information management system 10. In some embodiments, the storage manager 26 is a separate component of the information management system 10. In the illustrated embodiment, the storage manager 26 is operable to communicate with the other components of the information management system 10, including the client computing device 12 and the primary and secondary storage systems 14, 18.

The client computing device 12 and other components in the information management system 10 typically are interconnected by a variety of different types of network technologies, including a wide area network, a local area network, a virtual private network, and the internet, to name a few. The client computing device 12 communicates with the primary storage system 14 and the secondary storage system 18. In some embodiments, the client computing device 12 is connected with one or more of the primary and the secondary storage devices 16, 20 over wired and/or wireless network communications connections. The primary storage devices 16 may be implemented by any of a wide variety of different types of storage devices, including disk drives, hard-disk arrays, solid-state drives, and network attached storage. The one or more secondary storage devices 20 typically are implemented by lower cost archival systems, such as tape drives, slower disk drives, and optical drives. The storage manager 26 is configured to communicate with the elements of the primary and secondary storage systems

14, 18. The storage manager 26 also is operable to initiate and manage archiving operations, system backups, migrations, and recoveries.

Examples of the types of client computing devices 12 that produce data that can be stored in an archive or a backup storage system include workstations, servers, laptops, mobile phones, as well as internet-of-things devices, such as autonomous computing and communicating agents and smart sensors. These computing devices and other components in the information management system 10 generate potentially useful data and metadata as they execute one or more respective modules (e.g., a database archiver 22), applications (e.g., a database application 24), and managers (e.g., a storage manager 26). Example applications include client applications, server applications, and operating systems, including mail applications, file applications, database applications, word processing applications, spreadsheet applications, presentation applications, financial applications, and other desktop publishing and productivity applications.

A primary database 36 on the primary storage system 14 stores active data and metadata that are generated by the client computing device 12 and other components in the information management system 10. These data can be stored in the one or more primary storage devices 16 of the primary storage system 14. The data and metadata that are produced by the database application 24 and other applications (including client and server operating systems) executing on the client computing device 12 and stored on the primary storage devices 16 are collectively referred to herein as "active data." Active data typically is formatted and stored in the primary database 36 in the native format of the application that generated the active data. In some embodiments, active data includes database data, files, directories, file system volumes, data blocks, and other groupings or subsets of data objects. In other embodiments, active data is formatted according to, for example, a flat file system in which directory entries for all files are stored in a single directory. In some examples, each client computing system 12 executes a respective database application 24 that generates its own active data and stores that data in a respective primary storage device 16. In other examples, a plurality of client computing systems 12 executing respective database applications 24 store active data in a shared primary storage device 16.

The database archiver 22 manages the archiving of data associated with the database application 24. In some examples, the database archiver 22 is operable to extract metadata from the database application 24 on one or more of the primary storage devices 16 and, based on the extracted metadata, determine information relating to the database application 24. Such information may include the database schema, the table structures, the dependencies between tables, and the commands of the database application 24. As explained in detail below, in some embodiments, the process of archiving data involves copying the selected active data from the primary database 36 on the primary storage system 14 and storing the copied selection of active data in the secondary data storage system 18 as archived data; and, after the selected copied active data has been stored in the secondary data storage system 18, deleting the selected active data from the primary database 36. Archiving unused or infrequently used data typically is used to increase storage space available on the higher performing primary storage devices 16 and thereby improve the performance of the primary storage devices 16 in the primary storage system 14.

Figure 2:
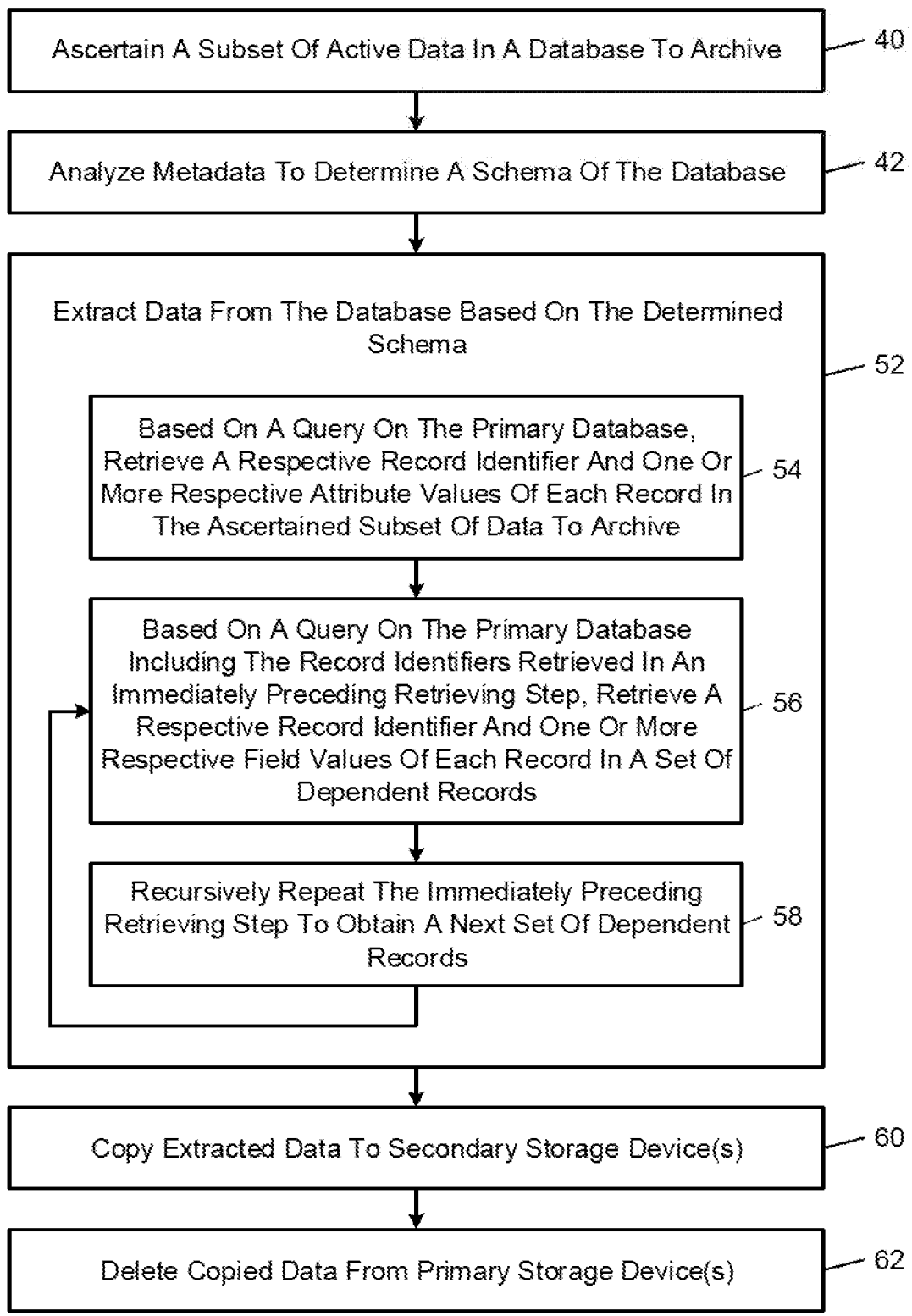
FIG. 2 shows a flow diagram of an embodiment of a process for archiving data from one or more primary storage devices to one or more secondary storage devices.

Referring to FIG. 2, in an embodiment, the information management system 10 is operable to implement an exemplary process of archiving data that is generated by the database application 24. In particular, the information management system 10 is operable to reduce (e.g., minimize) the number of database queries or calls needed to retrieve a target set of data objects from a relational database as compared with conventional data retrieval approaches.

In accordance with this embodiment, the storage manager 26 ascertains a subset of the active data in the primary database 36 to archive (FIG. 2, block 40). In an example, a user selects or designates a subset of the active data in the primary database 36 in the primary storage system 14 to archive. In an example, the user can use a graphical user interface of the client computing system 12 to instruct the storage manager 26 to initiate a process of archiving the selected data. In response to the user's selection, the storage manager may instruct the database archiver to archive the selected data. In some examples, the storage manager 26 instructs the database archiver 22 to archive the selected data in the secondary storage system 20, which includes one or more secondary storage devices 20 storing archived data. In some examples, the database application 24 has its own database archiver 22 that manages the archiving of the data for the database application 24.

After receiving the archiving instructions from the storage manger 26, the database archiver 22 retrieves information relating to the database schema, including metadata, and analyzes that information to determine a schema of the primary database 36 (FIG. 2, block 42). The database schema enables the database archiver 22 to determine relationships between the tables and other relational database data structures and data objects in the primary database 36. Based on the relationship information, the database archiver 22 can structure the archiving process in a way that maintains the relationships between the data objects in the relational database. For example, the database archiver 22 may structure the archiving operations in ways that avoid breaking dependencies in the primary database 36 or in the archived data 38 during the archiving processes of copying the selected data to the archive data store and deleting the selected data from the primary database 36.

As explained above, the database archiver 22 determines the relationships between the tables of the primary database 36 based on the schema of the primary database 36. The database schema typically defines the structure of the primary database 36 and the organization of data in the primary database 36. In a relational database, the schema typically specifies the data structures of the primary database 36 and the way in which the data structures relate to one another. For example, a database typically includes an arrangement of tables, each of which includes rows and columns of data. A row (or record) typically corresponds to an instance of an entity represented by the table, and columns typically correspond to respective attributes associated with the entity. Tables may be associated with primary keys or foreign keys. A primary key is an identifier that uniquely identifies each row in a table, whereas a foreign key identifies a column in a table that refers to a column in another table. In this way, foreign keys can create relationships or dependencies between the tables of a database.

Figure 3:
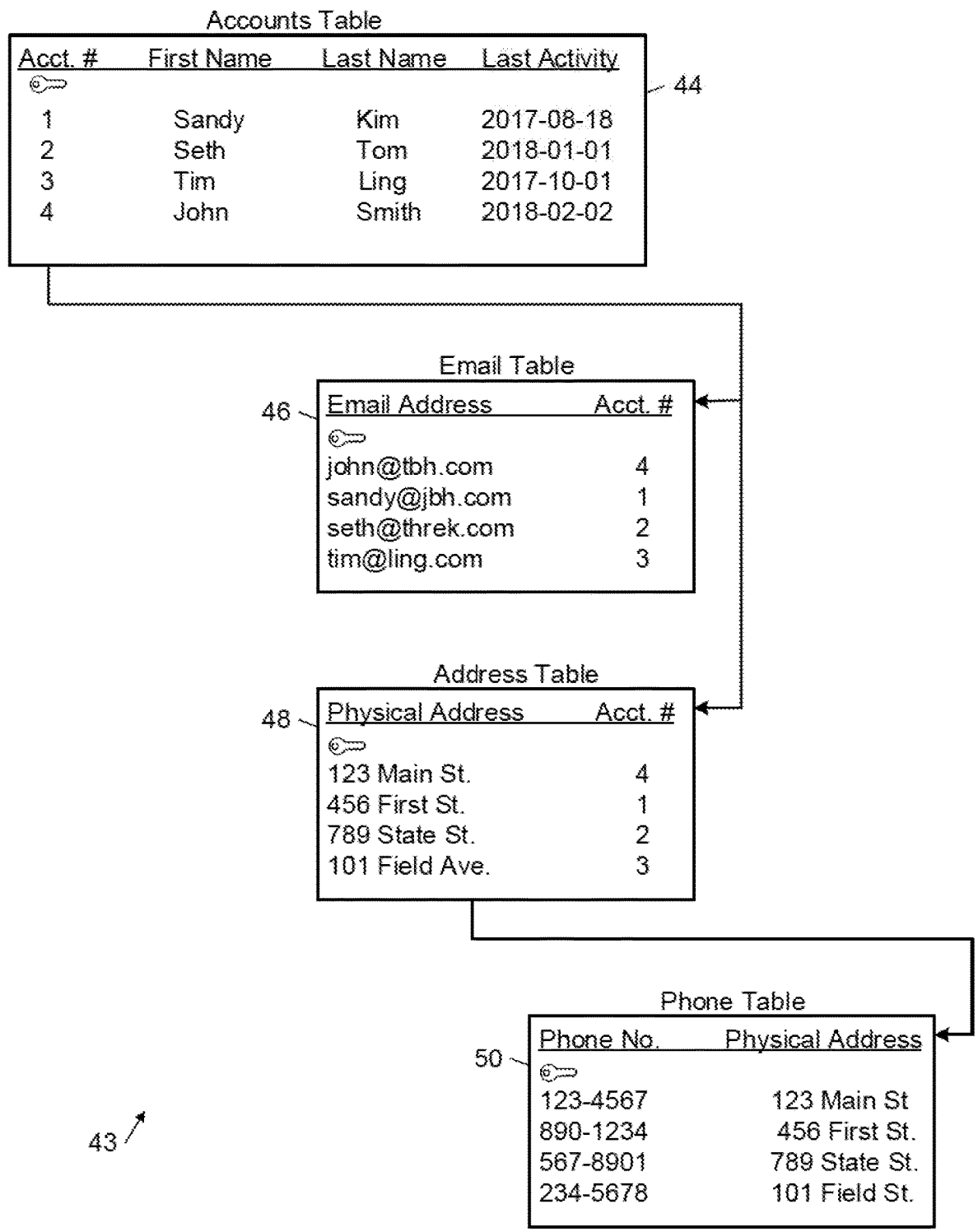
FIG. 3 is a block diagram of data organized in a plurality of related tables.

FIG. 3 shows an exemplary database 43 that is organized into set of tables and their respective dependencies according to a particular schema. In the illustrated example, the tables include an Accounts Table 44, an Email Table 46, an Address Table 48, and a Phone Table 50. The Accounts Table 44 has an Account No. attribute, a First Name attribute, a Last Name attribute, and a Last Activity attribute that contains the date of last activity date associated with the corresponding Account No., where the Account No. is a primary key that uniquely identifies each row of the Accounts Table 44. The Email Table 46 has an Email Address attribute and an Account No. attribute, where Email Address is a primary key that uniquely identifies each row in the Email Table 46 and the Account No. is a foreign key that cross-references the Accounts Table 44. The Address Table 48 has a Physical Address attribute and an Account No. attribute, where Physical Address is a primary key that uniquely identifies each row in the Address Table 48 and the Account No. is a foreign key that cross references the Accounts Table 44. The Phone Table 50 has a Phone No, attribute and a Physical Address attribute, where the Phone No. is a primary key that uniquely identifies each row in the Phone Table 50 and the Physical Address is a foreign key that cross references the Address Table 48.

In the example scenario described above, the user selects a subset of the active data (e.g., records) in the primary database to archive (e.g., a set of accounts that have been inactive for 90 days or more). In response, the database archiver 22 determines the tables that are related to the subset of the selected active data in the primary database 36. The database archiver 22 then archives both the selected subset of the active data and the related (e.g., dependent) records. The database archiver 22 also uses internal programmatic logic to traverse the database data objects to identify relationships between the tables and process the data. For example, the database archiver 18 is configured to determine when two tables contain records that relate to records in another table.

Referring back to FIG. 2, the database archiver 22 extracts data from the primary database 36 based on the determined schema (FIG. 2, block 52). In an example process, the database archiver 22 retrieves a respective record identifier and one or more respective attribute values of each record in the ascertained subset of data to archive by querying the primary database 36 (e.g., a SELECT query) (FIG. 2, block 54). For example, the database archiver 22 may request all accounts that have been inactive for 90 days or more. Referring to FIG. 3, such a request can be implemented by selecting records in the Accounts Table 44 with a Last Activity date 90 days or more before the current date (e.g., Mar. 1, 2018). In this example, the accounts with a Last Activity date 90 days before Mar. 1, 2018, are Account No. "2" and Account No. "4". Therefore, the database archiver 22 returns the records associated with Account No. "2" and Account No. "4".

Next, the database archiver 22 retrieves a respective record identifier (e.g., a primary key) and one or more respective attribute values of each record in a set of dependent records based on a query on the primary database 36 that includes the record identifiers retrieved in an immediately preceding retrieving step (FIG. 2, block 56). In the illustrated example, the record identifiers that were retrieved in the immediately preceding retrieving step are the primary key record identifiers for Account No. "2" and Account No. "4". Accordingly, the database archiver 22 implements a single query on the primary database 36 that includes the record identifiers for Account No. "2" and Account No. "4". In the illustrated example, each of the Email Table 46 and the Address Table 48 includes the record identifiers for Account No. "2" and Account No. "4". Consequently, the single query returns the records that include the Email Addresses corresponding to the multiple Account Nos. "2" and "4" (i.e., seth@threk.com and john@tbh.com) and the Physical Addresses corresponding to Account Nos. "2" and "4" (i.e., "789 State St." and "123 Main St.").

The immediately preceding retrieving step is recursively repeated to obtain a next set of dependent records (FIG. 2, block 58). In this regard, the record identifiers that were retrieved in the immediately preceding retrieving step are the two primary key Email Addresses (i.e., "seth@threk.com" and john@tbh.com) and the two primary key Physical Addresses (i.e., "789 State St." and "123 Main St."). Accordingly, the database archiver 22 implements a single query on the primary database 36 that includes the primary key record identifiers "seth@threk.com", "john@tbh.com", "789 State St.", and "123 Main St." Based on execution of a query on the primary database that includes the primary key record identifiers "seth@threk.com", "john@tbh.com", "789 State St.", and "123 Main St.", the database archiver 22 retrieves the primary key Phone Nos. "567-8901" and "123-4567".

The process of extracting data from the database 36 described above in connection with blocks 52-58 of FIG. 2 offers significant improvements over conventional data retrieval approaches. For example, instead of following a path-based approach for traversing hierarchical data, the approach described above can collect multiple records across multiple trees per query. In fact, the approach disclosed above minimizes the number of database query calls needed to extract the target data. In this way, the disclosed data extraction approach can reduce the cost of archiving data while significantly improving the performance of the information management system 10.

Referring back to FIG. 2, the database archiver 22 copies the extracted data and transfers the copied data to one or more of the secondary storage devices 20 for archiving (FIG. 2, block 60). In this process, the database archiver 22 constructs rules to extract and archive the selected data based on the determined relationships between the tables of the primary database 36. In an example, the rules specify that the archived data includes records in the Accounts Table 44 with a Last Activity date 90 days or more before the current date. The database archiver 22 recursively extracts data to be archived based on the determined table relationships. In an example, the database archiver 22 retrieves all the records to be archived from the target tables and copies them to the secondary storage system 18. The database archiver 22 copies the extracted data to be archived from one or more primary storage devices 16 to one or more secondary storage devices 20. In some examples, the secondary storage devices 20 may be implemented by lower cost archival systems, such as tape drives, slower disk drives, and optical drives. The extracted data may be stored in a variety of different formats, including standard or proprietary file formats and tables of a database.

After copying the retrieved data from the primary storage system 14 to the secondary storage system 18 (FIG. 2, block 60), the database archiver 18 deletes the copied data from the primary storage system 14 (FIG. 2, block 62). As mentioned above, the copied data must be deleted in a carefully determined sequence in order to avoid breaking dependencies in the primary database 36. For example, records that are referenced by or linked to other tables should not be deleted before the referencing or linked tables are deleted. The database archiver 22 is operable to determine the order in which the copied records should be deleted based on the database schema to avoid deleting any referenced records before deleting the referencing records.

After the selected data and the associated related data has been archived in the secondary storage system 18 and deleted from the primary storage system 14, some or all of the archived data can be restored to the primary database, if desired.

Figure 4:
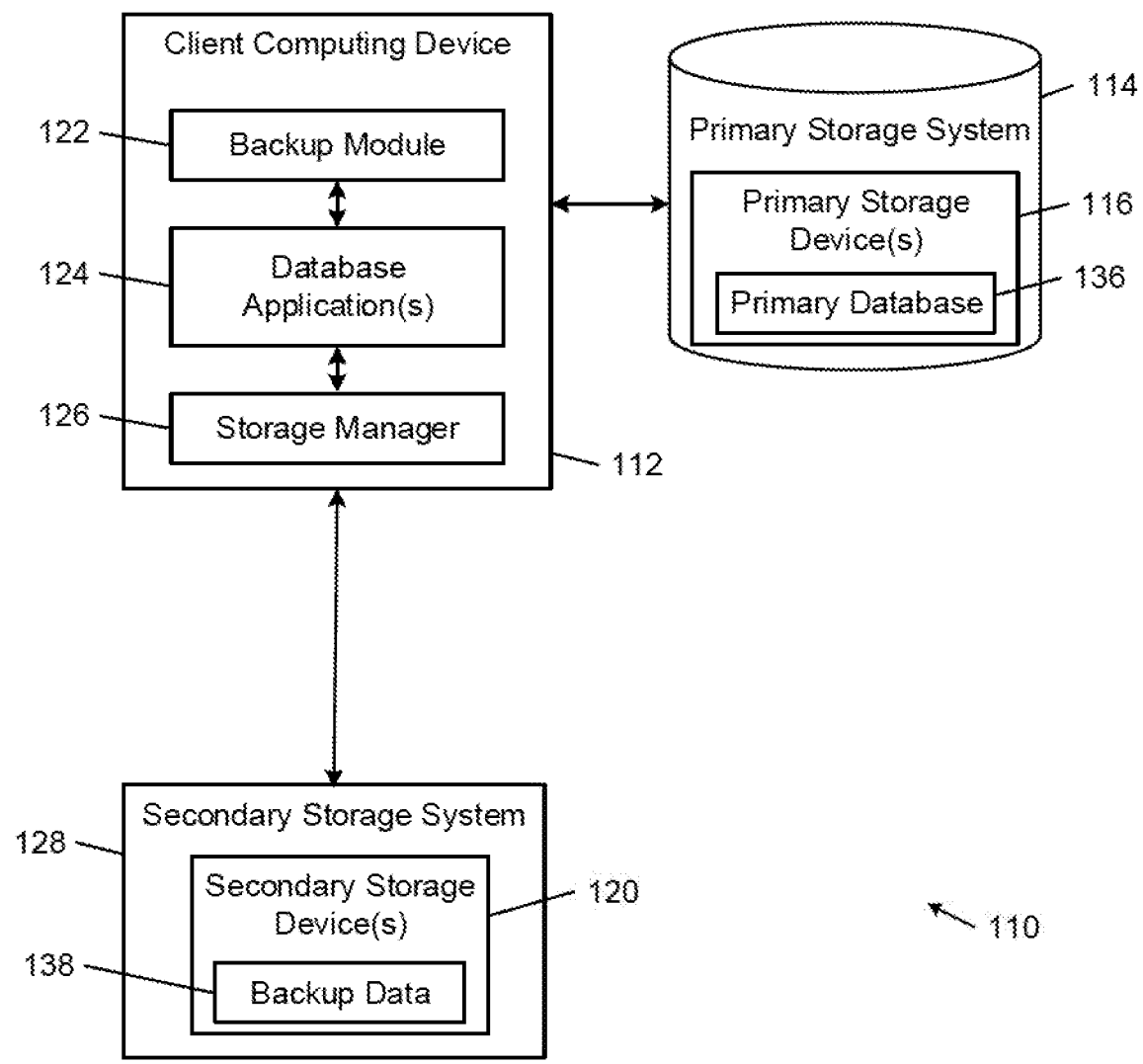
FIG. 4 is a block diagram of an embodiment of an information management system.

FIG. 4 is a block diagram of an exemplary network storage architecture system that includes an embodiment of an information management system 10 that includes various components that individually or collectively, in whole or in part manage, transfer, store, and process data and metadata. The information management system 10 includes a client computing device 112, a primary storage system 114 that includes one or more primary storage devices 116, and a secondary storage system 118 that includes one or ore secondary storage devices 120.

In the illustrated example, the client computing device 112 includes a database backup module 122, at least one database application 124, and a storage manager 126. In some embodiments, the database backup module 22 is a component of the storage manager 26. In other embodiments, the database backup module 122 is a separate component of the information management system 110. In some embodiments, the storage manager 126 is a separate component of the information management system 110. In the illustrated embodiment, the storage manager 126 is operable to communicate with the other components of the information management system 110, including the client computing device 112 and the primary and secondary storage systems 114, 118.

The client computing device 112 and other components in the information management system 110 typically are interconnected by a variety of different types of network technologies, including a wide area network, a local area network, a virtual private network, and the internet, to name a few. The client computing device 112 communicates with the primary storage system 114 and the secondary storage system 118. In some embodiments, the client computing device 112 is connected with one or more of the primary and the secondary storage devices 116, 120 over wired and/or wireless network communications connections. The primary storage devices 116 may be implemented by any of a wide variety of different types of storage devices, including disk drives, hard-disk arrays, solid-state drives, and network attached storage. The one or more secondary storage devices 120 typically are implemented by lower cost archival systems, such as tape drives, slower disk drives, and optical drives. The storage manager 126 is configured to communicate with the elements of the primary and secondary storage systems 114, 118. The storage manager 126 also is operable to initiate and manage archiving operations, system backups, migrations, and recoveries.

Examples of the types of client computing devices 112 that can produce data that can be stored in a backup storage system include workstations, servers, laptops, mobile phones, as well as internet-of-things devices, such as autonomous computing and communicating agents and smart sensors. These computing devices and other components in the information management system 110 generate potentially valuable data and metadata as they execute one or more respective modules 122 (e.g., a database backup module), applications 124 (e.g., a database application), and managers 126 (e.g., a storage manager). Example applications include client applications, server applications, and operating systems, including mail applications, file applications, database applications (e.g., database and archiving applications), word processing applications, spreadsheet applications, presentation applications, financial applications, and other desktop publishing and productivity applications.

A primary database 136 on the primary storage system 114 stores active data and metadata that are generated by the client computing device 112 and other components in the information management system 110. These data can be stored in the one or more primary storage devices 116 of the primary storage system 114. The data and metadata that are produced by the database application 124 and other applications (including client and server operating systems) executing on the client computing device 112 and stored on the primary storage devices 116 are collectively referred to herein as "active data." Active data typically is formatted and stored in the primary database 136 in the native format of the application that generated the active data. In some embodiments, active data includes database data, files, directories, file system volumes, data blocks, and other groupings or subsets of data objects. In other embodiments, active data is formatted according to, for example, a flat file system in which directory entries for all files are stored in a single directory. In some examples, each client computing system 112 executes a respective database application 124 that generates its own active data and stores that data in a respective primary storage device 16. In other examples, a plurality of client computing systems 12 executing respective database applications 124 store active data in a shared primary storage device 116.

The backup module 122 manages the backup of data associated with the database application 124. In some examples, the backup module 122 is operable to extract metadata from the database application 124 on one or more of the primary storage devices 116 and, based on the extracted metadata, determine information relating to the database application 124. Such information may include the database schema, the table structures, the dependencies between tables, and the commands of the database application 124. As explained in detail below, in some embodiments, the process of backing up data involves copying the active data from the primary database 136 on the primary storage system 114 and storing the copied active data into the secondary data storage system 118 as backup data.

Figure 5:
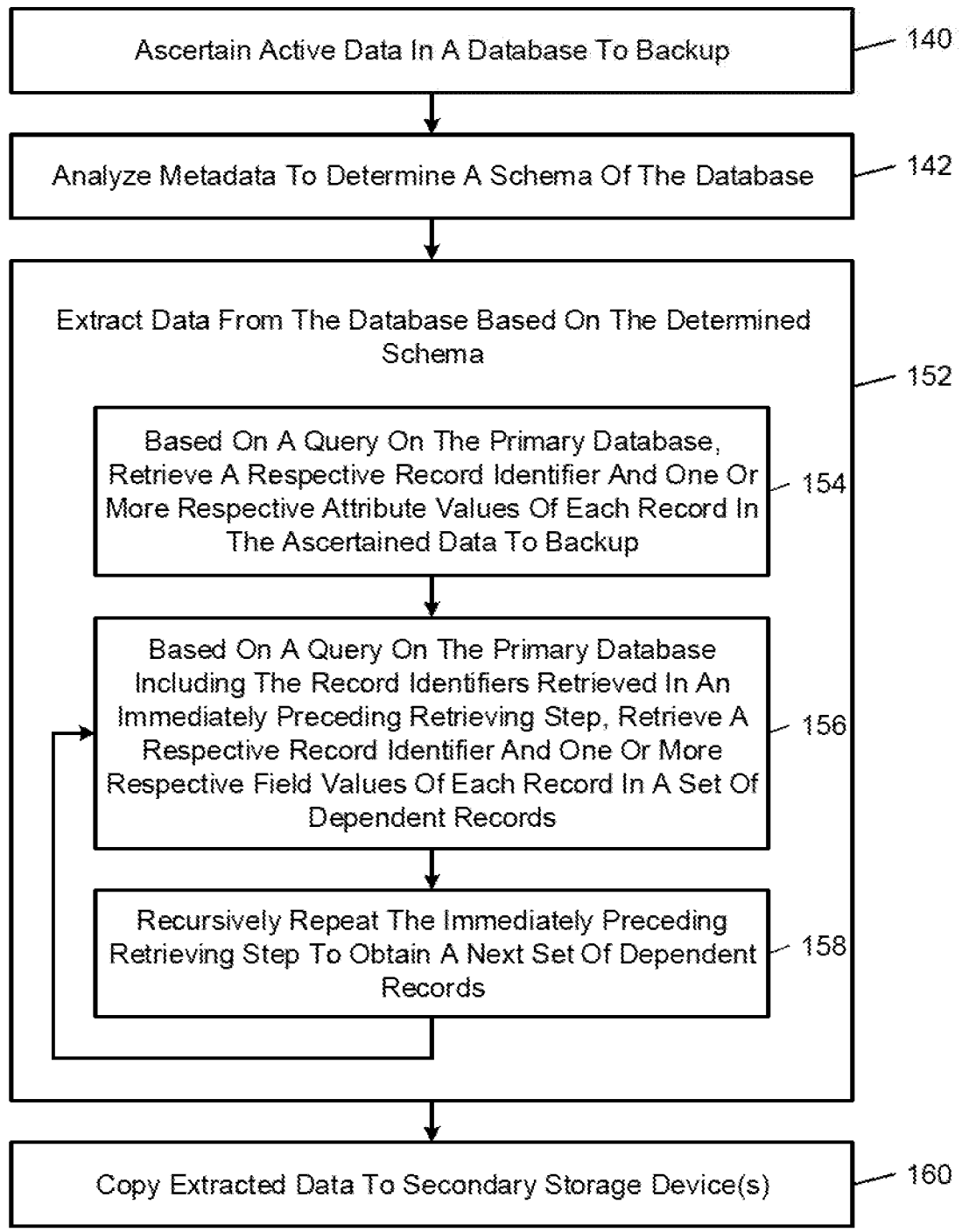
FIG. 5 shows a flow diagram of an embodiment of a process for backing up data from one or more primary storage devices to one or more backup storage devices.

Referring to FIG. 5, in an embodiment, the information management system 110 is operable to implement an exemplary process of generating a backup of the primary database 136 that is generated by the database application 124. In particular, the information management system 110 is operable to reduce (e.g., minimize) the number of database queries or calls needed to retrieve a target set of data objects from a relational database as compared with conventional data retrieval approaches.

In accordance with this embodiment, the storage manager 126 ascertains the active data in the primary database 136 to back up (FIG. 5, block 140). In an example, a user selects the active data in the primary database 136 in the primary storage system 114 to back up. In an example, the user can use a graphical user interface of the client computing system 112 to instruct the storage manager 26 to initiate a process of backing up the data in the primary database 136. In response to the backup instruction, the storage manage 126 may instruct the backup module 122 to back up the selected data. In some examples, the storage manager 126 instructs the backup module 22 to create a backup of the data in the primary database 136 and store the backup in the secondary storage system 128, which includes one or more secondary storage devices 120 storing archived data. In some examples, the database application 124 has its own backup module 122 that manages the creation and storage of the backup data.

After receiving the backup instructions from the storage manger 126, the backup module 122 retrieves information relating to the database schema, including metadata, and analyzes that information to determine a schema of the primary database 36 (FIG. 5, block 142). The database schema enables the backup module 122 to determine relationships between the tables and other relational database data structures and data objects in the primary database 136. Based on the relationship information, the database backup module 122 can structure the backup process in a way that maintains the relationships between the data objects in the relational database.

As explained above, the backup module 122 determines the relationships between the tables of the primary database 136 based on the schema of the primary database 136. The database schema typically defines the structure of the primary database 136 and the organization of data in the primary database 36. In a relational database, the schema typically specifies the data structures of the primary database 136 and the way in which the data structures relate to one another. For example, a database typically includes an arrangement of tables, each of which includes rows and columns of data. A row (or record) typically corresponds to an instance of an entity represented by the table, and columns typically correspond to respective attributes associated with the entity. Tables may be associated with primary keys or foreign keys. A primary key is an identifier that uniquely identifies each row in a table, whereas a foreign key identifies a column in a table that refers to a column in another table. In this way, foreign keys can create relationships or dependencies between the tables of a database. (FIG. 3 shows an exemplary database 43 that is organized into set of tables and their respective dependencies according to a particular schema.)

The backup module 122 extracts data from the primary database 136 based on the determined schema (FIG. 5, block 152). In an example process, the backup module 122 ascertains a "root" table (e.g., the Accounts Table 44 shown in FIG. 3). Starting with the "root" table, the backup module 122 traverses the dependencies between the tables and retrieves a respective record identifier and one or more respective attribute values of each record in each table of the primary database 136 using, for example, a SELECT query (FIG. 5, block 154). For example, the backup module 122 may request all accounts from the Accounts Table 44 to retrieve the records corresponding to account ID's 1, 2, 3, and 4 in the Accounts Table 44.

Next, the backup module 122 retrieves a respective record identifier (e.g., a primary key) and one or more respective attribute values of each record in a set of dependent records based on a query on the primary database 136 that includes the record identifiers retrieved in an immediately preceding retrieving step (FIG. 5, block 156).

In the illustrated example shown in FIG. 3, the record identifiers that were retrieved in the immediately preceding retrieving step are the primary key record identifiers for Account Nos. "1", "2", "3", and "4". Accordingly, the backup module 122 implements a single query on the primary database 136 that includes the record identifiers for Account Nos. "1", "2", "3", and "4". In the illustrated example, each of the Email Table 46 and the Address Table 48 includes the record identifiers for Account Nos. "1", "2", "3", and "4". Consequently, the single query returns the records that include the Email Addresses corresponding to Account Nos. Nos. "1", "2", "3", and "4" (i.e., "john@tbh.com", "sandy@jbh.com", "seth@threk.com", and "tim@ling.com") and the Physical Addresses corresponding to Account Nos. "1", "2", "3", and "4" (i.e., "456 First St.", "789 State St.", "101 Field Ave.", and "123 Main St.").

The immediately preceding retrieving step is recursively repeated to obtain a next set of dependent records (FIG. 5, block 158). In this regard, the record identifiers that were retrieved in the immediately preceding retrieving step are the four primary key Email Addresses (i.e., "john@tbh.com", "sandy@jbh.com", "seth@threk.com", and "tim@ling.com") and the four primary key Physical Addresses (i.e., "456 First St.", "789 State St.", "101 Field Ave.", and "123 Main St."). Accordingly, the backup module 122 implements a single query on the primary database 136 that includes the eight primary key record identifiers: "john@tbh.com", "sandy@jbh.com", "seth@threk.com", "tim@ling.com", "456 First St.", "789 State St.", "101 Field Ave.", and "123 Main St. Thus, based on execution of a single query on the primary database 136 that includes the primary key record identifiers, the backup module 122 retrieves the primary key Phone Nos. "123-4567", "890-1234", "567-8901", and "234-5678".

The process of extracting data from the database 136 described above in connection with blocks 152-158 of FIG. 5 offers significant improvements over conventional data retrieval approaches. For example, instead of following a path-based approach for traversing hierarchical data, the approach described above can collect multiple records across multiple trees per query. In fact, the approached disclosed above minimizes the number of database query calls needed to extract data from the database tables. In this way, the disclosed data extraction approach can reduce the cost of backing up data while significantly improving the performance of the information management system 10.

Referring to FIG. 5, the backup module 122 copies the extracted data and transfers the copied data to one or more of the secondary storage devices 20 (FIG. 5, block 160). In this process, the backup module 122 constructs rules to extract and backup the selected data based on the determined relationships between the tables of the primary database 136. In an example, the rules specify that the backup data includes records in the Accounts Table 44 show in FIG. 3. The backup module 122 recursively extracts data to be backed up based on the determined table relationships. In this process, the backup module 122 retrieves all the records to be backed up from the tables in the primary database 136 and copies them to the secondary storage system 118. The backup module 122 copies the extracted data to be backed up from one or more primary storage devices 116 to one or more secondary storage devices 120. The extracted data may be stored on a variety of different storage devices in a variety of different formats, including standard or proprietary file formats and tables of a database.

For a variety of reasons, the active data 136 stored on one or more of the primary storage devices 116 may become unavailable. For example, some of all of the primary data 136 may be deleted, overwritten, damaged, or otherwise corrupted. For these reasons, the information management system 110 includes the secondary storage system 128 that has a one or more secondary storage 120 that create and store one or several backup copies 138 of the primary data stored in the primary database 136. In some examples of this process, the client computing device 112 creates one or more backup copies of the active data in the primary database 136 and transmits the backup copies 138 to the secondary storage devices 120 for storage in the secondary storage system 128.

The backup copies 138 can be used to restore primary data (e.g., data and metadata) to the primary database 136 that has been compromised (e.g., lost or corrupted), thereby enabling some or all of the compromised data to be recovered up to a certain time in the past corresponding to the time the last backup copy was made. In this way, the backup copies can assist with regulatory data retention and electronic discovery requirements. The backup copies may be created in different ways to produce different types of backups, including backup operations, archive operations, snapshot operations, and replication operations. Backup copies typically are stored in a backup format. A restore operation performed on a backup copy produces data and metadata that is formatted in the native application format of the application or applications that produced the primary data, or transmitted to the application in another format which is supported (e.g. via an Application Programming Interface).

In some embodiments, the information management system 110 also includes a backup and recovery system (not shown) that is configured to initiate, coordinate, and control operations performed by the information management system 110. The backup and recovery system can communicate with and control some or all aspects of the information management system 110, including operations and processes for generating and storing the primary data 136 and the backup copies 138, and managing and protecting the primary data 136 and the backup copies 138. In embodiments, the backup and recovery system may be a software module or other application. In certain embodiments, the backup and recovery system performs operations including starting backup copy processes, allocating backup storage devices, deleting expired backup copies, and restoring backup copies into the primary storage system 114.

Exemplary Computer Apparatus

Figure 6:
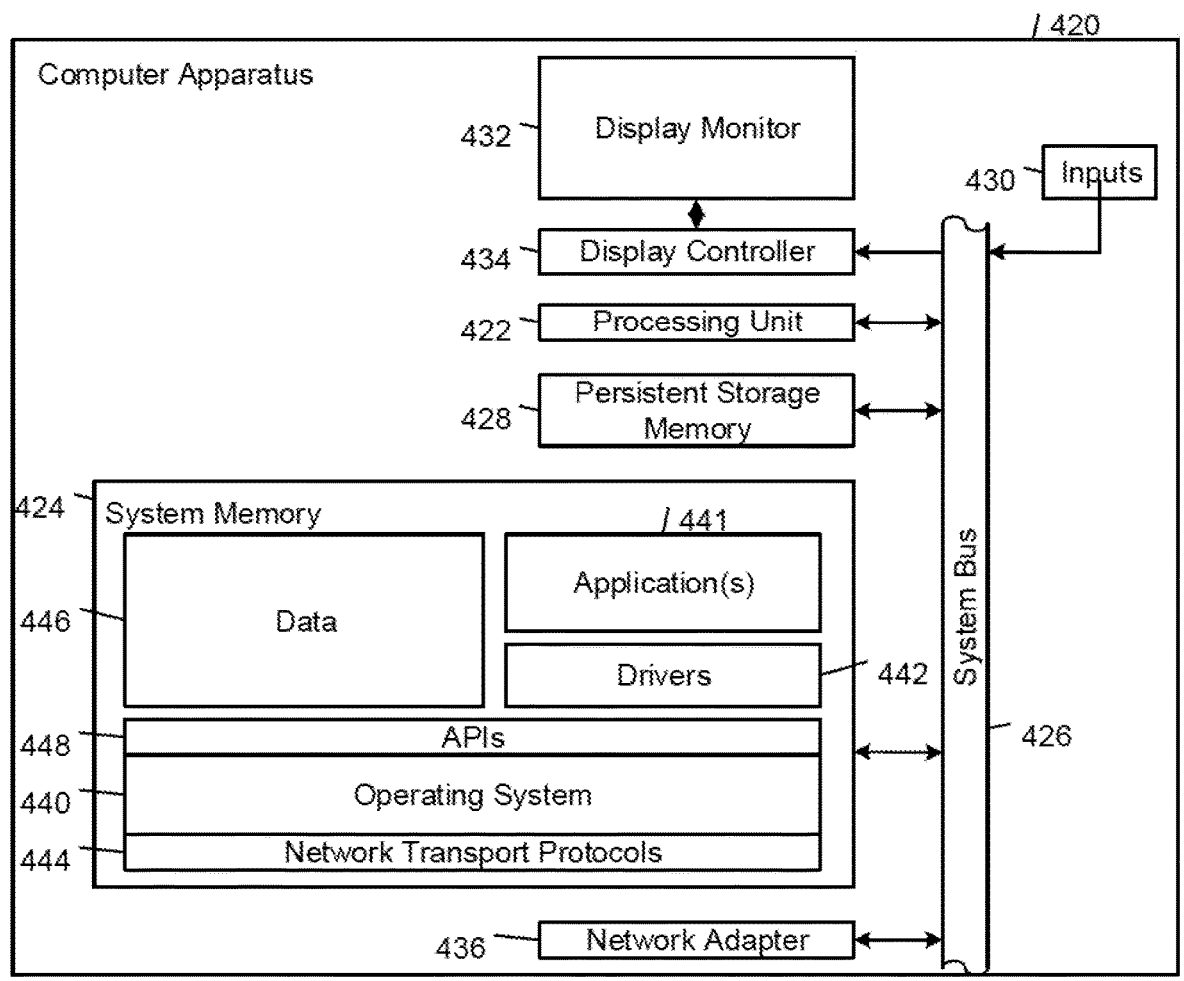
FIG. 6 is a block diagram of an example computer apparatus.

FIG. 6 shows an example embodiment of computer apparatus that is configured to implement one or more of the computing systems described in this specification. The computer apparatus 420 includes a processing unit 422, a system memory 424, and a system bus 426 that couples the processing unit 422 to the various components of the computer apparatus 420. The processing unit 422 may include one or more data processors, each of which may be in the form of any one of various commercially available computer processors. The system memory 424 includes one or more computer-readable media that typically are associated with a software application addressing space that defines the addresses that are available to software applications. The system memory 424 may include a read only memory (ROM) that stores a basic input/output system (BIOS) that contains start-up routines for the computer apparatus 420, and a random access memory (RAM). The system bus 426 may be a memory bus, a peripheral bus or a local bus, and may be compatible with any of a variety of bus protocols, including PCI, VESA, Microchannel, ISA, and EISA. The computer apparatus 420 also includes a persistent storage memory 428 (e.g., a hard drive, a floppy drive, a CD ROM drive, magnetic tape drives, flash memory devices, and digital video disks) that is connected to the system bus 426 and contains one or more computer-readable media disks that provide non-volatile or persistent storage for data, data structures and computer-executable instructions.

A user may interact (e.g., input commands or data) with the computer apparatus 420 using one or more input devices 430 (e.g. one or more keyboards, computer mice, microphones, cameras, joysticks, physical motion sensors, and touch pads). Information may be presented through a graphical user interface (GUI) that is presented to the user on a display monitor 432, which is controlled by a display controller 434. The computer apparatus 320 also may include other input/output hardware (e.g., peripheral output devices, such as speakers and a printer). The computer apparatus 420 connects to other network nodes through a network adapter 336 (also referred to as a "network interface card" or NIC).

A number of program modules may be stored in the system memory 424, including application programming interfaces 438 (APIs), an operating system (OS) 440 (e.g., the Windows® operating system available from Microsoft Corporation of Redmond, Wash. U.S.A.), software applications 441 including one or more software applications programming the computer apparatus 420 to perform one or more of the steps, tasks, operations, or processes of the hierarchical classification systems described herein, drivers 442 (e.g., a GUI driver), network transport protocols 444, and data 446 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A method of archiving data comprising, by one or more computing devices comprising computer hardware:
   ascertaining by a software module a subset of data in a database to archive, the data organized in a plurality of tables generated by a database application on a client computing device, the subset of data stored in a subset of the plurality of tables in the database on a primary storage system;
   obtaining by the software module metadata from the database in the primary storage system and, based on the obtained metadata, determining a schema of the database;

determining by the software module dependencies between the subset of tables and one or more other tables of the plurality of tables based on the metadata and the schema;

based on a query by the software module on the database, retrieving a respective record identifier and one or more respective attribute values of each record in the ascertained subset of data to archive;

based on a query by the software module on the database comprising the record identifiers retrieved in an immediately preceding retrieving step, retrieving a respective record identifier and one or more respective attribute values of each record in a set of dependent records;

recursively repeating the immediately preceding retrieving step to obtain a next set of dependent records;

extracting, from the primary storage system, data comprising the subset of data, and the retrieved record identifiers and respective attribute values in the database;

copying, by a secondary storage controller computer, the extracted data to a secondary storage system; and deleting the extracted data from the primary storage system.

2. The method of claim 1, wherein the retrieving comprises traversing the dependencies between tables in the subset of the plurality of tables stored in the database on the primary storage system.

3. The method of claim 2, wherein the retrieving comprises traversing parent-child relationships between the tables.

4. The method of claim 2, wherein the retrieving comprises traversing hierarchical levels of the tables.

5. The method of claim 1, wherein the retrieving comprises traversing multiple tables in a common hierarchical level of the tables with a single query.

6. The method of claim 1, wherein each record identifier in the ascertained subset of data to archive is stored in a first table in the primary database, and the retrieving of the respective record identifier and one or more respective attribute values comprises traversing a respective set of one or more tables in the primary database that depend from the first table.

7. The method of claim 1, wherein the recursively repeating is performed until all record identifiers and attribute values dependent from the subset of data in the primary database are retrieved.

8. The method of claim 1, wherein the primary database is a relational database.

9. The method of claim 8, wherein the secondary database is a flat file.

10. A data storage system configured to archive data, comprising:

a computing device executing a software module to ascertain a subset of data in a database to archive, the data organized in a plurality of tables generated by a database application executing on the client computing device, the subset of data stored in a subset of the plurality of tables in the database on a primary storage system;

the computing device executing the software module to obtain metadata from the database in the primary storage system and, based on the obtained metadata, determining a schema of the database;

the computing device executing the software module to determine dependencies between the subset of tables and one or more other tables of the plurality of tables based on the metadata and the schema;

the computing device retrieving a respective record identifier and one or more respective attribute values of each record in the ascertained subset of data to archive based on a query generated by the software module executing on the client computing device and transmitted over a network connection to the database;

the computing device retrieving a respective record identifier and one or more respective attribute values of each record in a set of dependent records based on a query by the software module on the database comprising the record identifiers retrieved in an immediately preceding retrieving step;

the computing device recursively repeating the immediately preceding retrieving step to obtain a next set of dependent records;

the computing device extracting, from the primary storage system, data comprising the subset of data, and the retrieved record identifiers and respective attribute values in the database;

a secondary storage controller computer copying the extracted data to a secondary storage system; and deleting the extracted data from the primary storage system.

11. The data storage system of claim 10, wherein the computing device retrieving further comprises, by the computing device, traversing the dependencies between tables in the subset of the plurality of tables stored in the database on the primary storage system.

12. The data storage system of claim 11, wherein the computing device retrieving further comprises, by the computing device, traversing parent-child relationships between the tables.

13. The data storage system of claim 11, wherein the computing device retrieving comprises, by the computing device, traversing hierarchical levels of the tables.

14. The data storage system of claim 10, wherein the computing device retrieving comprises traversing multiple tables in a common hierarchical level of the tables with a single query.

15. The data storage system of claim 10, wherein each record identifier in the ascertained subset of data to archive is stored in a first table in the primary database, and the computing device retrieving of the respective record identifier and one or more respective attribute values comprises the computing device traversing a respective set of one or more tables in the primary database that depend from the first table.

16. The data storage system of claim 10, wherein the computing device recursively repeating is performed until all record identifiers and attribute values dependent from the subset of data in the primary database are retrieved.

17. The data storage system of claim 10, wherein the primary database is a relational database stored in a primary storage system.

18. The data storage system of claim 17, wherein the secondary database is a flat file stored in a secondary storage system.

19. A computer program product for execution by a computer system and comprising at least one non-transitory computer-readable medium having computer-readable program code portions embodied therein, the computer-readable program code portions comprising:

an executable code portion configured to ascertain a subset of data in a database to archive, the data organized in a plurality of tables generated by a database application on a client computing device, the subset of data stored in a subset of the plurality of tables in the database in a primary storage system;

an executable code portion configured to obtain metadata from the database in the primary storage system and, based on the obtained metadata, determining a schema of the database;

an executable code portion configured to determine dependencies between the subset of tables and one or more other tables of the plurality of tables based on the metadata and the schema;

an executable code portion configured to retrieve a respective record identifier and one or more respective attribute values of each record in the ascertained subset of data to archive based on a query on the database;

an executable code portion configured to retrieve a respective record identifier and one or more respective attribute values of each record in a set of dependent records based on a query by the software module on the database comprising the record identifiers retrieved in an immediately preceding retrieving step;

an executable code portion configured to recursively repeat the immediately preceding retrieving step to obtain a next set of dependent records;

an executable code portion configured to extract, from the primary storage system, data comprising the subset of data, and the retrieved record identifiers and respective attribute values in the database;

an executable code portion configured to copy, by a secondary storage controller computer, the extracted data to a secondary storage system;

an executable code portion configured to delete the extracted data from the primary storage system.

20. A method of backing up data comprising, by one or more computing devices comprising computer hardware:

ascertaining, by a software module, data in a database to back up, the data organized in a plurality of tables generated by a database application executing on a client computing device;

obtaining by the software module metadata from the database in a primary storage system and, based on the obtained metadata, determining a schema of the database;

determining by the software module dependencies between the tables of the database based on the metadata and the schema;

based on a query by the software module on the database, retrieving a respective record identifier and one or more respective attribute values of each record in the database;

based on a query by the software module on the database comprising the record identifiers retrieved in an immediately preceding retrieving step, retrieving a respective record identifier and one or more respective attribute values of each record in a set of dependent records;

recursively repeating the immediately preceding retrieving step to obtain a next set of dependent records;

extracting, from the primary storage system, data comprising the ascertained data, the retrieved record identifiers, and respective attribute values in the database; and copying, by a backup storage controller computer, the extracted data to a backup storage system.

* * * * *